Aug. 23, 1932.   J. M. CARR   1,872,886
SANDING APPARATUS
Filed May 14, 1931   2 Sheets-Sheet 1
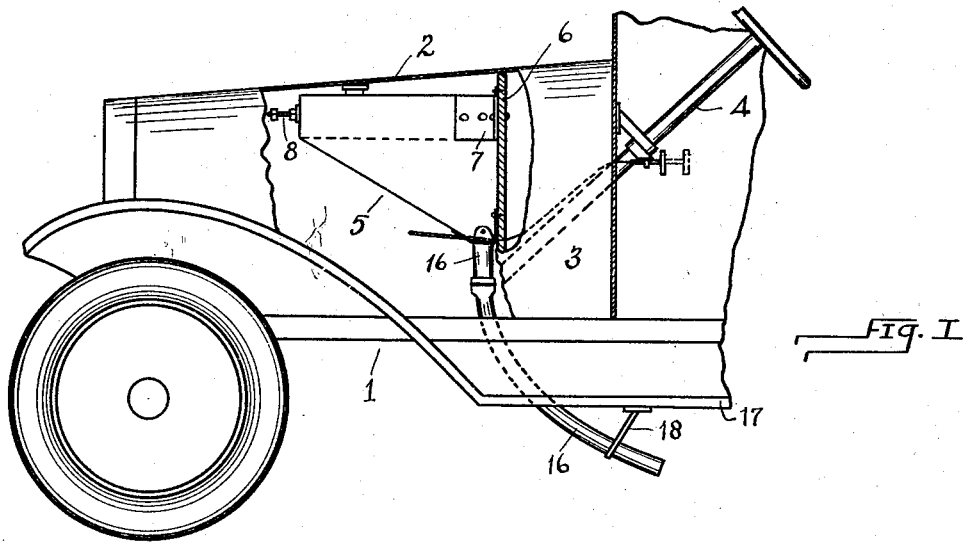
Fig. I
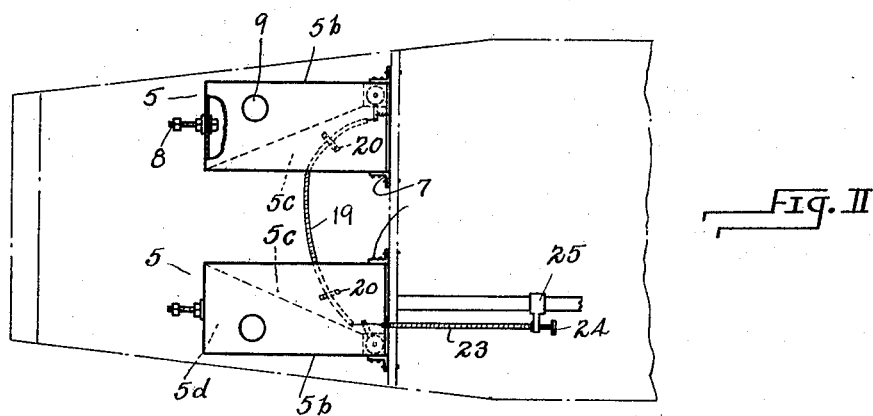
Fig. II
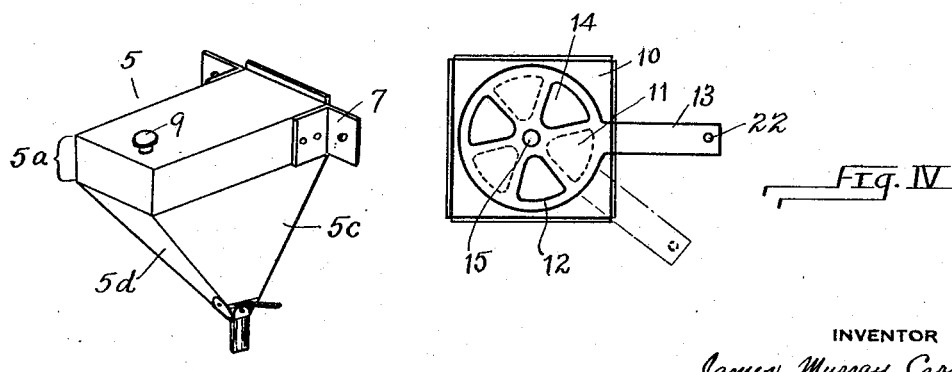
Fig. III    Fig. IV
INVENTOR
James Murray Carr
by Christy, Christy and Wharton
his attorneys Aug. 23, 1932.  J. M. CARR  1,872,886
SANDING APPARATUS
Filed May 14, 1931  2 Sheets-Sheet 2
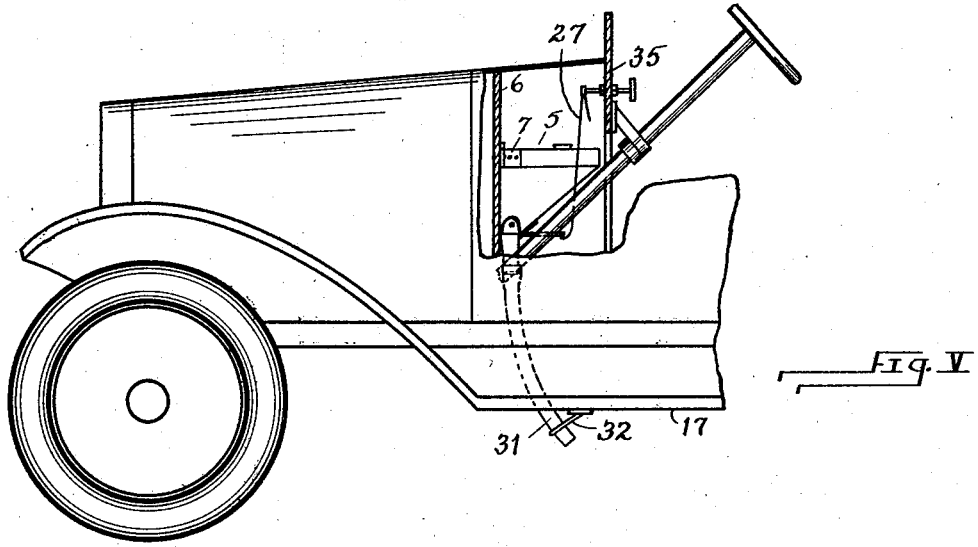
Fig. V
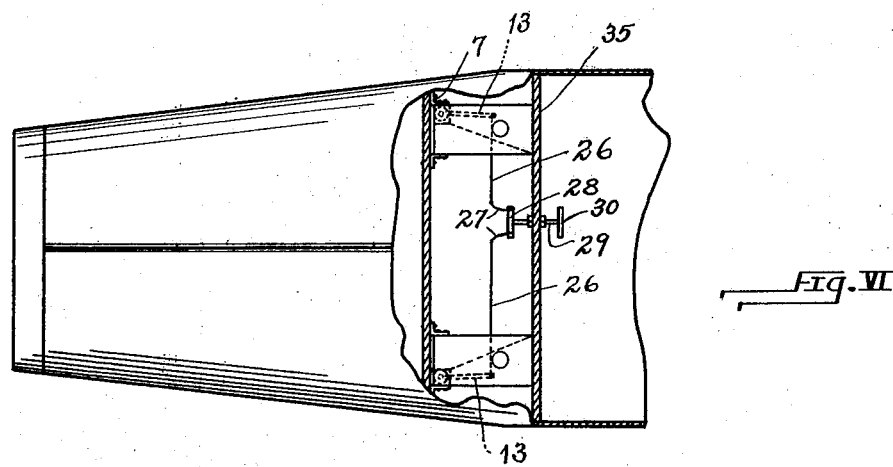
Fig. VI
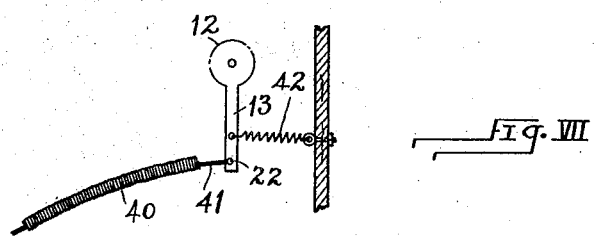
Fig. VII
INVENTOR
James Murray Carr
by Christy Christy and Wharton
his attorneys Patented Aug. 23, 1932

1,872,886

UNITED STATES PATENT OFFICE

JAMES MURRAY CARR, OF PITTSBURGH, PENNSYLVANIA

SANDING APPARATUS

Application filed May 14, 1931. Serial No. 537,263.

This invention relates to sanding apparatus for power-propelled vehicles.

In the use of an automobile it frequently happens that the major proportion of the stretch of roadway included in a trip is relatively free of ice, packed snow, or other material which may tend to produce skidding of the vehicle, but that there are some stretches of roadway throughout which the danger of skidding is to be anticipated. Under such circumstances it is undesirable to apply chains to rear wheels of the vehicle, as it is an unpleasant task to apply or remove chains, and as the chains themselves become worn after having been used throughout a certain mileage. It is, therefore, desirable to provide apparatus by which sand may be applied to the roadway in advance of the rear wheels of the vehicle and in the path to be followed by them.

In utilizing sanding apparatus on an automobile it is necessary that the sand be maintained free of moisture, that the operating connections for releasing the sand to the roadway be readily accessible and operable by the driver of the automobile; and it is highly desirable that the container or containers for the sand, and the means for deliverying the sand from the container, be so positioned and housed that their use does not materially detract from the general appearance of the automobile. Various devices have hitherto been employed or proposed for keeping the sand in a dry condition, in which it will flow readily, by passing exhaust gases through the sand of the container, or by utilizing the heating effect caused by resistance to the passage of electric current. When containers have been mounted upon or under the running board of automobiles, or in the chassis, various actuating connections for the sand releasing valve or valves have been employed, long connections and special operating means being necessary because of the relatively remote positioning of the sand containers with respect to the seated position of the driver of the automobile.

To state the nature of my invention generally, I have evolved an automobile sanding apparatus in which the containers for the sand are so formed that they may be, and are, mounted within a protective covering formed by a portion of the car body. Further, I mount them in such position that the sand is subjected to gentle heating by the engine of the automobile itself, and in such position that very short valve operating connections may be used to place the delivery of sand under the direct control of the driver of the automobile.

The object of my invention is to provide simple sanding means, in which the sand containers are protected from excessive moisture, and are subjected to gentle heating; sanding means in which the connections for operating the valve or valves, to deliver the sand, are simple and efficient; and sanding means in which substantially all the apparatus is concealed within the body of the automobile, so that it does not detract from the external appearance of the automobile.

In the accompanying drawings Figure I is a fragmentary side elevation of the forward portion of an automobile, broken away in regions to show the mounting of the sand receptacles and the sand delivering means associated therewith; Figure II is a plan view showing the sand receptacles and their connections, and indicating the outline of the automobile body in which they are mounted; Figure III is an isometric view illustrating the special form of one of the sand containers; Figure IV is a plan view of the sand-delivering valve associated with each of the containers; Figure V is a fragmentary side elevation of the forward portion of an automobile, broken away in regions to show an alternative mounting of the sand receptacles and the sand-delivering means associated therewith; Figure VI is a plan view of the forward portion of an automobile, partly broken away to show the receptacles in plan view and the partitions to which they are attached in horizontal section; and Figure VII is a fragmentary plan view showing the structure of the operating connections and the spring for assisting in returning the valves to closed position.

In the accompanying drawings reference numeral 1 designates generally the structure of the automobile in which the sanding apparatus is mounted, reference numerals 2 and 3 designate respectively the hood and cowl of the automobile, and reference numeral 4 designates the steering post of the automobile.

With respect specifically to the form of my sand receptacles, I so shape these receptacles that sand may readily flow to the point of delivery therefrom, and so shape them that they may be mounted either under the hood or under the cowl of the automobile, in free space therein, and in a position in which they do not interfere with the driving of the automobile or the comfort of a passenger. When installed either under the hood or under the cowl, the sand receptacles are subjected to gentle heating by the engine of the automobile, which heating tends to maintain the sand in a dry condition so that it may flow readily from the receptacle. As shown, two receptacles 5 are employed, and are mounted under the hood of the automobile by attachment to the vertical partition 6 between the hood and cowl.

Each of the receptacles 5 comprises an upper portion 5a of rectangular contour. The lower portion of the sand receptacle comprises a side wall 5b, which extends vertically, and forms a direct continuation of one side wall of the upper rectangular portion 5a. The other side wall 5c of the receptacle, lying below the upper portion 5a of the container, is inclined vertically toward the region of sand delivery. The forward end wall 5d of the lower portion of the receptacle is inclined rearwardly to the sand outlet.

The general funnel shape of the receptacle permits free flow of sand to the point of sand delivery. The contouring of the receptacle, moreover, performs the additional function of limiting the space occupied by the sand receptacle as a whole; so that when two receptacles are mounted under the hood 2 of an automobile, as shown, the receptacles conform to the space requirements imposed by the usual positioning of the vacuum tank, generating system, and ignition system of the automobile.

The receptacles 5 are attached to the forward face of the partition 6 by means of bracket 7, which consists of angle members having one leg thereof secured to the side of the upper portion 5a of the receptacle, and the other leg connected to the partition 6. At the forward end of each of the receptacles means may be applied for additionally supporting the weight of the receptacle. As shown, such means comprise bolts 8 fastened to the forward wall of the portion 5a of each of the receptacles, to extend horizontally therefrom. Supporting connections may be made between these bolts 8 and any suitable element of the automobile body lying within the hood 2.

A supply opening in each of the receptacles 5 is provided with a closure cap 9. It will be noted that these supply openings are located in the upper wall of the receptacle, and that the receptacle may be readily filled by any suitable openings in the hood covers, or by lifting the hood covers.

At the discharge terminal of each of the receptacles 5 is a plate 10, comprising discharge apertures 11, and supporting a rotatably mounted valve plate 12. An operating arm 13 of the valve plate 12 extends outwardly beyond the mounting plate 10. Through valve plate 12 are openings 14 which may be brought more or less into registry with the discharge openings 11 in the stationary mounting plate 10 by rotation of the valve plate about its axis 15. From the discharge openings of each receptacle there extends a discharge pipe 16 which projects downwardly and slightly rearwardly from the discharge end of the receptacle. The greater portion of this discharge pipe 16 is housed within the hood 2, or lies behind the running board 17 of the automobile, so that a slight portion only of the pipe is exposed to view. Toward its rearward end discharge pipe 16 is supported from the running board by means of a bracket 18 of any suitable form.

Since two receptacles are desirably employed, it is convenient to interconnect their valves so that both valves may be simultaneously operated by a single actuating means. Such connecting means, as shown, comprise a flexible shaft 19 which is mounted in straps 20 on the inclined lower side wall 5c of each of the receptacles, and is attached at its ends in openings 22 in the stem 13 of each of the valves. To the stem or arm 13 of the valve which lies nearest the steering post 4 is attached a connection 23, which is terminally attached to a handle member 24, slidably mounted in a bracket 25 on steering post 4. While this connection may be in a sense flexible, it must possess sufficient stiffness to permit a pushing as well as a pulling action on the valve. Similarly the interconnection 19 between the valves, while flexible, must possess sufficient stiffness to be capable of transmitting a pushing action on the valve which is not directly connected to operating handle 24.

Figures V and VI of the drawings show identically shaped receptacles and identical parts of the automobile itself. In this modified position of the sanding apparatus, however, both the receptacles 5 are mounted at their rearward ends to the inner face of partitions 6 by means of indentically similar brackets 7, and are disposed forwardly of dashboard 35. Their forward ends may be supported in any suitable manner. In this positioning the receptacles may be conveniently filled by way of a ventilator or ventilators, commonly positioned in the cowl of the automobile body.

It should be particularly noted that the receptacles 5 in their reversed position adapt themselves equally well to space requirements within the body of the car. Thus the upper porton 5a of each receptacle is disposed above the steering post 4, and the cutting away of the lower portion of the receptacle by inclination of their faces 5c leaves foot room under the cowl of the car.

Valves, and valve-operating connections, identically similar to those shown in Figures I to IV, inclusive, of the drawings, may be employed to actuate the valves of the sanding apparatus mounted in this modified portion also. I show, however, alternative operating means to effect the simultaneous actuation of the valves 12 controlling the delivery conduit 16. In this modified form of actuating connections the stem or arm 13 of each of the valves is provided with an extension 26, and connected to each of these extensions is a flexible connector 27. The opposite terminals of these flexible connections are attached to the ends of an arm 28, carried by a shaft 29 rotatably mounted in dashboard 35. At the inner terminal of shaft 29 is an operating handle 30.

By these connections the valves are simultaneously opened to the desired extent, and are closed by rotation of handle 30 rather than by the pushing and pulling action effected by operation of the handle 24, shown in Figures I and II of the drawings.

As a convenient structure for assuring that the connections possess the necessary stiffness, while possessing sufficient flexibility to accommodate for changes of direction, a flexible metallic casing 40 may desirably be used to surround operating wires, designated generally as 41, which are slidable in it.

In order to supplement the effect of the flexible connections in moving the valves to closed position, I may also use a light spring 42, which is attached to the arm 13 of the valve plate 12 furthest removed from the operating handle. If one receptacle only, and consequently only one valve, be utilized, a similar light spring serving to assist in closing that valve may desirably be employed. In either case, it is desirable to so predetermine the force, which will be exerted by the spring, that the effect of the spring will not of itself be capable of moving the valve or valves to closed position. The spring of course serves to hold the valve in closed position against accidental opening caused by jolting or jarring.

The discharge pipe 31 from each of the receptacles is positioned in general similarity to the positioning of the discharge pipe 16, shown in Figures I and II, and is supported at its rearward extremity by means of bracket 32 on running board 17.

It may be noted specifically in connection with both the discharge pipes 16 and the discharge pipes 31 that they are so curved as to comprise no abrupt bend which would impede the flow of sand from the receptacle. This is of importance in that it permits sand to flow from the receptacles without the use of agitating means, which add to the cost of the apparatus and are an element likely to need repair.

The only portion of the apparatus which is visible in an exterior view of the automobile is the short length of the discharge pipe which projects below the running board. If mounted under the hood 2, the sand receptacles are wholly hidden from view, and if mounted under the cowl 3, they are so positioned as to be unobtrusive and sightly. In either mounting of the sanding apparatus the sand within the receptacles is protected from rain or snow, so that the tendency of the sand to absorb moisture is minimized. Further, in both instances, the receptacles are subjected to gentle heating from the engine of the automobile, so that the sand is maintained in a dry condition to flow readily from the receptacles. The mounting of the sand receptacles and their valves so close to the position of the driver permits the use of short and simple valve-operating means.

I claim as my invention:

1. In an automobile having an internal combustion engine and a vertical partition in the forward portion thereof adjacent the engine, sand containing receptacles mounted on said partition within the body of the automobile and subjected to the heating effect of the automobile engine, valved delivery conduits leading from said sand receptacles, and delivery controlling connections operable from the driver's seat of the automobile.

2. In an automobile having an internal combustion engine, a plurality of sand containing receptacles mounted within the body of the automobile in position subjected to heating effect caused by dissipation of heat directly from the engine walls, and valve controlled delivery conduits leading from said receptacles.

3. In an automobile having an internal combustion engine, a plurality of sand containing receptacles mounted within the body of the automobile in position subjected to heating effect caused by dissipation of heat directly from the engine walls, valved delivery conduits leading from said receptacles, and valve operating means positioned for actuation from the driver's seat of the automobile and arranged for simultaneous operation of the valves of all the delivery conduits.

4. In an automobile having an internal combustion engine, sanding apparatus comprising a receptacle having at least one wall portion inclined both laterally and longitudinally of the receptacle, and a valved delivery conduit leading from said receptacle, said receptacle mounted in position subjected to heating effect from the internal combustion engine of the automobile and in position that the double inclination of a wall thereof accommodates the receptacle to space requirements within the body of the automobile.

5. In an automobile having an internal combustion engine and a vertical partition in the forward region thereof adjacent the engine, sand-containing receptacles mounted on said partition within the body of the automobile and subjected to the heating effect of the automobile engine, valved delivery conduits leading from said sand receptacles, and valve-actuating connections operable from the driver's seat and comprising wire of sufficient stiffness to exert a pushing action to operate the valves in one direction.

6. In an automobile having an internal combustion engine and a vertical partition in the forward region thereof adjacent the engine, sand-containing receptacles mounted on said partition within the body of the automobile and subjected to the heating effect of the engine, valved delivery conduits leading from said receptacles, valve-actuating connections operable from the driver's seat and comprising wire of sufficient stiffness to exert a pushing action to operate the valve in one direction, and a flexible conduit defining a path of movement for the operating wire.

7. In an automobile having an internal combustion engine, a plurality of sand-containing receptacles mounted within the body of the automobile in position subjected to heating effect from the engine, valved delivery conduits leading from said receptacles, and valve-operating connections comprising wire sufficiently stiff to exert a pushing action to operate the valves in one direction, said valve-actuating connections positioned for actuation from the driver's seat of the automobile and arranged for simultaneous operation of the valves of all the delivery conduits.

8. In an automobile having an internal combustion engine, a plurality of sand-containing receptacles mounted within the body of the automobile in position subjected to heating effect from the engine, valved delivery conduits leading from said receptacles, valve-operating connections comprising wire sufficiently stiff to exert a pushing action to operate the valves in one direction, said valve-actuating connections positioned for actuation from the driver's seat of the automobile and arranged for simultaneous operation of the valves of all the delivery conduits, and a flexible conduit defining a path of movement for the operating wire.

9. In an automobile having an internal combustion engine, a plurality of sand-containing receptacles mounted within the body of the automobile in position subjected to heating effect from the engine of said automobile, valved delivery conduits from said receptacles, valve-operating connections comprising wire sufficiently stiff to exert a pushing action to operate the valves in one direction, said valve-actuating connections positioned for actuation from the driver's seat of the automobile and interconnecting the valves for simultaneous operation of the valves of all the delivery conduits, and a light spring associated with one of the valves to supplement the pushing action of the actuation wire.

10. In an automobile having an internal combustion engine, a plurality of sand-containing receptacles mounted within the body of the automobile in position subjected to heating effect from said receptacles, valved delivery conduits from said receptacles, valve-operating connections comprising wire sufficiently stiff to exert a pushing action to operate the valves in one direction, said valve-actuating connections positioned for actuation from the driver's seat of the automobile and interconnecting the valves for simultaneous operation of the valves of all the delivery conduits, and a flexible conduit defining a path of movement for the operating wire.

11. In a power-propelled vehicle a sand-containing receptacle mounted within the body of the vehicle in the forward portion thereof, a valved delivery conduit leading from said receptacle, and valve-actuating connections operable from the driver's seat of the vehicle and comprising wire of sufficient stiffness to exert a pushing action to operate the valve of the delivery conduit in one direction.

12. In a power-propelled vehicle a sand-containing receptacle mounted within the body of the vehicle, a valved delivery conduit leading from said receptacle, valve-actuating connections operable from the driver's seat of the vehicle and comprising wire of sufficient stiffness to exert a pushing action to operate the valve in one direction, and a light spring arranged to act on said valve to supplement the pushing action of the operating wire.

13. In a power-propelled vehicle a sand-containing receptacle mounted within the body of the vehicle in the forward portion thereof, a valved delivery conduit leading from said receptacle, valve-operating connections comprising wire sufficiently stiff to exert a pushing action to operate the valve in one direction, and a flexible conduit defining a path of movement for the operating wire.

14. Sanding apparatus for power-propelled vehicles comprising a receptacle having at least one wall portion inclined both laterally and longitudinally of the receptacle, a valve delivery conduit leading from said receptacle, valve-operating connections comprising wire sufficiently stiff to exert a pushing action to operate the valve in one direction, a light spring associated with said valve and arranged to exert a force supplementing the pushing action of the operating wire, said valve-actuating connections positioned for actuation from the driver's seat of the automobile.

In testimony whereof I have hereunto set my hand.

JAMES MURRAY CARR.